No. 845,179. PATENTED FEB. 26, 1907.
A. KOREN, Jr.
WATERING SYSTEM FOR GARDENS, FIELDS, AND THE LIKE.
APPLICATION FILED AUG. 4, 1905.
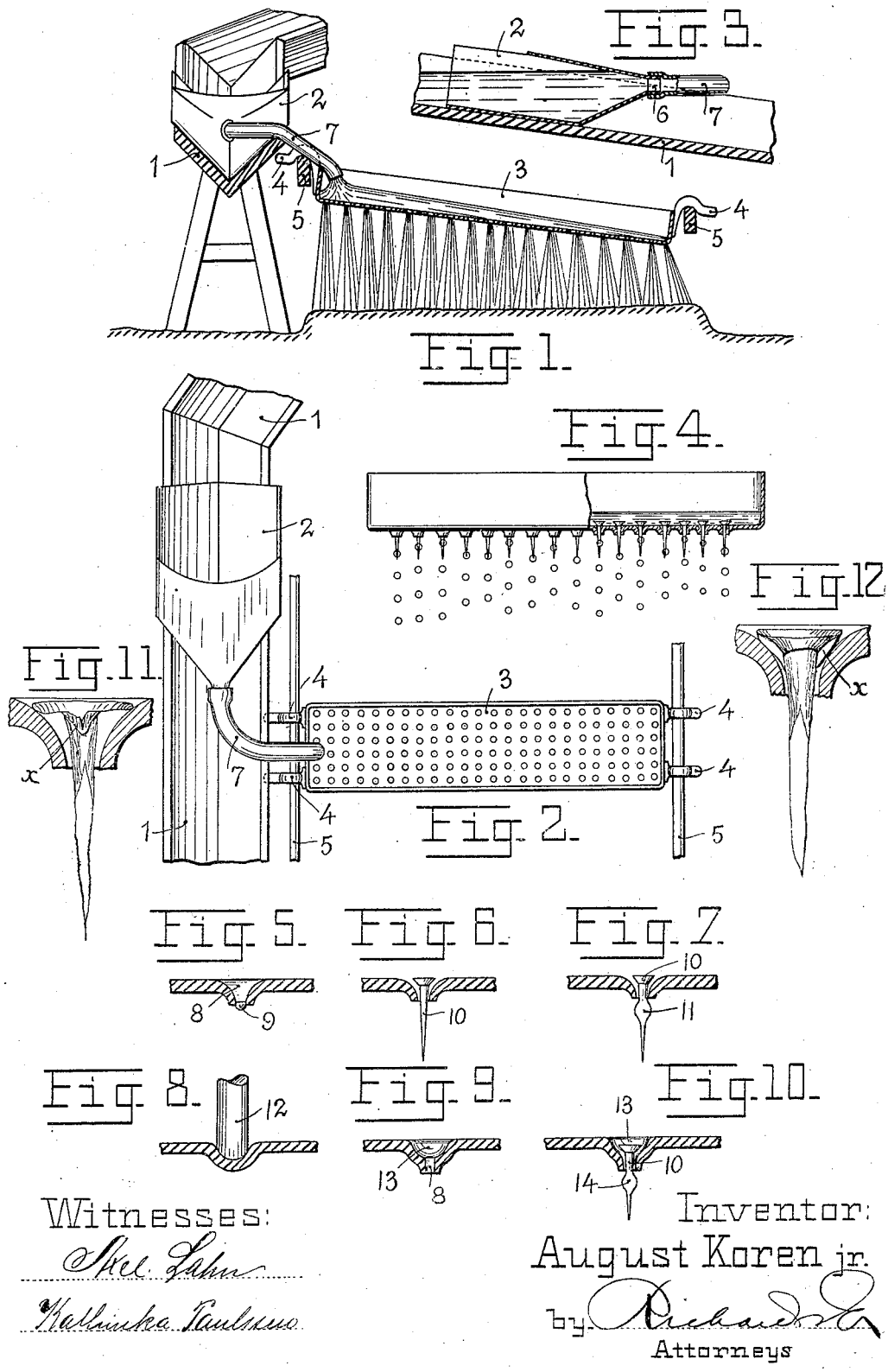
Witnesses:
Inventor:
August Koren jr.
by
Attorneys

UNITED STATES PATENT OFFICE.

AUGUST KOREN, JR., OF CHRISTIANIA, NORWAY.

WATERING SYSTEM FOR GARDENS, FIELDS, AND THE LIKE.

No. 845,179.　　　Specification of Letters Patent.　　　Patented Feb. 26, 1907.

Application filed August 4, 1905. Serial No. 272,744.

*To all whom it may concern:*

Be it known that I, AUGUST KOREN, Jr., a citizen of Norway, residing at Christiania, Norway, have invented new and useful Improvements in Watering Systems for Gardens, Fields, and the Like, of which the following is a specification.

This invention relates to means for watering large gardens and fields; and the object of the invention is to water large areas quickly and easily.

The invention is illustrated in the accompanying drawings, in which—

Figure 1 is a sectional elevation of this invention. Fig. 2 is a plan view thereof. Fig. 3 is a longitudinal section of the delivery-funnel and water-conduit. Fig. 4 is an elevation, partly in section, of the spraying vessel. Fig. 5 is a sectional view, on an enlarged scale, showing one of the holes in the bottom of the spraying vessel. Fig. 6 is a view like Fig. 5, but showing a tack in the hole. Fig. 7 is a like view showing a tack having an enlargement to hold it in position. Fig. 8 shows the manner of forming a recess in which the hole is to be formed. Fig. 9 shows the recess and the hole therein and Fig. 10 is a like view with the tack in position. Figs. 11 and 12 are sectional views, on an enlarged scale, showing the irregularities in the tack by means of which the tack is prevented from entirely closing the hole.

The area to be watered is preferably divided into sections of suitable length and width by supporting-bars 5, and the water is conducted to adjacent said sections by a conduit 1. A delivery-funnel 2 is movably arranged in said conduit, the ower end of which terminates n a nozzle 6, which is on a level with the upper edge of the conduit 1, Fig. 3. As shown in this figure, the funnel 2 has the same sectional shape as in condu t 1 and fits tightly into the same, so that the water flowing along said conduit will be collected in the funnel and as soon as it rises to the height of the nozzle 6 will flow out therethrough into the flexible hose 7, which is connected to said nozzle. Said hose 7 passes over the side of the conduit, and its free end delivers the water into the spraying vessel 3. Said vessel is provided at each corner with hook-shaped lugs 4, which are adapted to engage with the bars 5, and thus support the vessel 6. The bar 5 adjacent to the conduit lies in a higher plane than the other bar 5, so that the spraying vessel is held in an inclined position, as shown in Fig. 1. Thus the water will flow from the hose 7 along the bottom of the spraying vessel toward the lower side thereof. The said vessel 3 has its bottom perforated for the passage of the water.

I have found that it is difficult to obtain a complete emptying of the spraying vessel when the perforations therein are of small size, as the pressure height is too little to force the fluid pellicle through the small hole, as shown in Fig. 5, 9 being the drop of water held between the walls of the hole. In order to overcome this defect without increasing the diameter of the holes, I place a nail, pin, or the like in said hole, said pin being of such a size as to leave a space between itself and the walls of the hole for the passage of water, so that the water may pass therethrough and drop off the end of said pin. After the pin or nail has been placed in the hole I flatten out a portion thereof, as at 11, Fig. 7, so as to prevent the same from falling out. As shown in Figs. 11 and 12, the tacks or pins have burs $x$, formed thereon by the pressing operation by which they are formed, and these burs engage the walls of the hole and so prevent the tack from entirely closing said hole. If such burs are not large enough to bear against the walls of the holes, the head thereof is never exactly circular, so that openings are left between the head and the hole sides to give passage for the water.

An especially-preferred mode of producing the holes is illustrated in Figs. 8 and 9. In the bottom of the spraying vessel I first form a recess 13 by means of a piston 12, and in this recess the hole 8 is made. The nail or pin may be formed (see Fig. 10) with a thickened part 14, so that it can be forced through the hole 8, the edges of the latter yielding a little and springing back when the thickened portion has passed.

In the operation of the device the water flowing down the conduit 1 passes from the funnel 2 into the hose 7 and from the hose 7 into the vessel 3, from which it passes through the perforations therein drop by drop onto the ground. The vessel 3 is slowly moved along the bars 5 to distribute the water over a large area. The funnel is moved along with the vessel 3, and for this purpose the hose 7 may be connected with the vessel, so that it will pull the said funnel along the conduit as the spraying vessel is moved.

I claim as my invention—

1. A watering system for gardens, fields and the like, comprising a spraying vessel, a conduit and means for delivering the water from the conduit into the vessel, said means comprising a device for collecting the water in the conduit until it rises above the sides of the conduit.

2. A watering system for gardens, and the like, comprising a movable spraying vessel and open conduit, a funnel movable in the conduit and a connection from said funnel to the vessel.

3. A watering system for gardens and the like comprising a vessel having perforations in its bottom, rails upon which said vessel is supported, one of said rails being higher than the other so that said vessel is held in an inclined position and means for delivering water to said vessel.

4. A watering system comprising a conduit, a movable funnel therein, the rear part of said funnel fitting easily the inner sectional shape of the conduit, a spraying vessel and a connection from the nozzle to the vessel.

5. A spraying vessel having perforations therein and pins arranged in said perforations.

6. In a watering system, a vessel having perforations therein and pins in said perforations, each of said pins having a head and a thickened portion to hold the pin in the perforation.

In testimony whereof I have signed my name to this specification in the presence of two subscribing witnesses.

AUGUST KOREN, Jr.

Witnesses:
HENRY BORDEWICH,
AXEL LAHN.